UNITED STATES PATENT OFFICE.

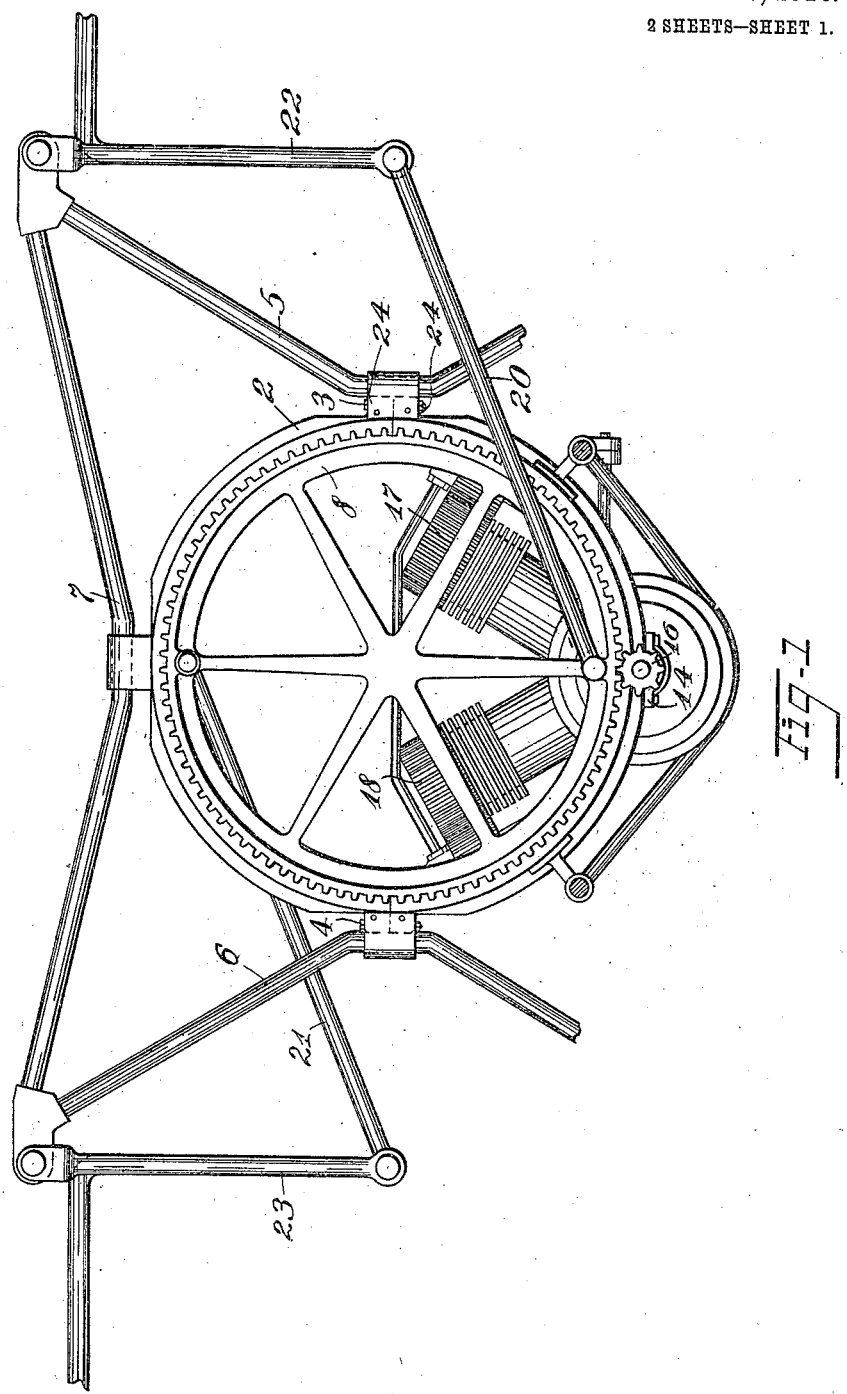

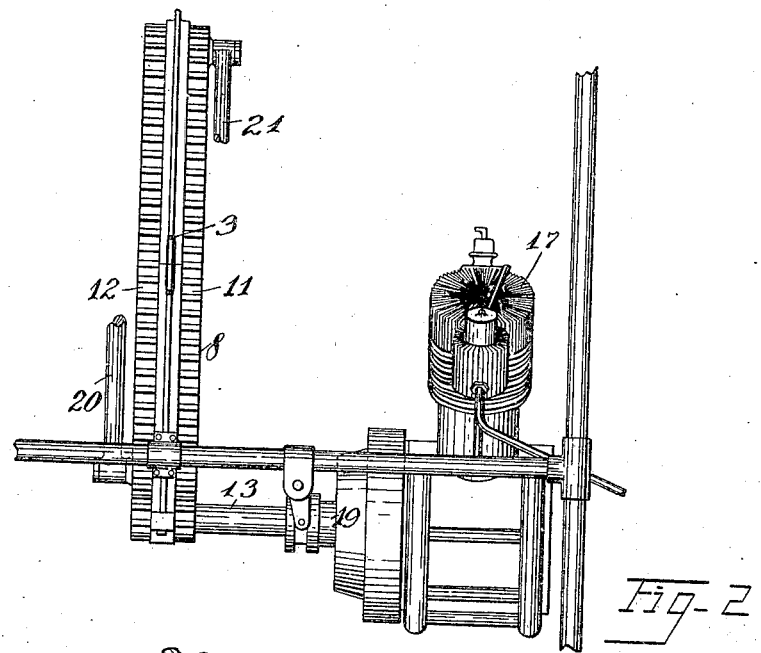
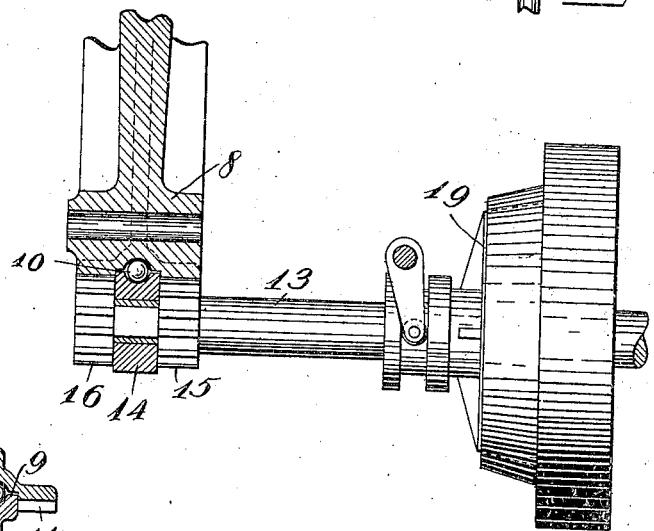
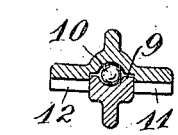

HARRY C. GAMMETER, OF BRATENAHL, OHIO.

MECHANICAL MOVEMENT.

948,782. Specification of Letters Patent. Patented Feb. 8, 1910.

Original application filed October 9, 1907, Serial No. 396,546. Divided and this application filed February 18, 1909. Serial No. 478,659.

*To all whom it may concern:*

Be it known that I, HARRY C. GAMMETER, a citizen of the United States, residing at Bratenahl, in the county of Cuyahoga and State of Ohio, have invented a certain new and useful Improvement in Mechanical Movements, of which the following is a full, clear, and exact description, reference being had to the accompanying drawings.

The object of this invention is to provide an efficient and compact mechanism for the transmission of motion.

The mechanism herein shown is adapted for use in a variety of relations, but finds its highest efficiency when used where economy of space, lightness of construction, and reduction from a high to comparatively low speed are required. Such conditions arise in the construction of machines for aerial navigation, and occur in many other machines.

The present application is a division of my application No. 396,546, for a flying machine, where this driving mechanism is shown as operating the wings of an orthopter.

Generally speaking, the invention comprises the elements and combinations thereof set forth in the accompanying claims.

Reference should be had to the accompanying drawings, in which—

Figure 1 is a side elevation of a mechanism embodying my invention; Fig. 2 is an end elevation of the showing in Fig. 1; Fig. 3 is a side elevation of the controlling clutch, driving wheel and a section of a main portion of the driven gear; Fig. 4 is a detail showing in section the main gear and bearing ring.

Any suitable support or frame may be employed as a mounting for the various parts of the mechanism, and for the purpose I have shown a frame composed of tubular members suitably joined together to form a rigid structure.

A ring 2 is formed in two parts, which are secured together by the ears 3 and 4, through which bolts 24 pass, and these ears are secured by suitable clips or other fastening means to the bars 5 and 6 forming a part of the frame. The ring is also held against relative movement by its engagement with a bar 7 which forms a part of the frame, and if desirable, the ring may be secured at other points. Within the ring 2 is mounted the main or driven gear 8. This gear has a groove 9 seating directly over the ring and in the adjacent faces of the ring and groove is an annular ball raceway in which is held a complete circle of balls 10. This makes a very simple and effective ball bearing for the gear 8, the balls being put in place before the ring-halves are fastened together. The gear 8 is provided with a double set of gear teeth 11 and 12 on opposite sides of the ball groove 9. A driving shaft 13 extends outside the ring and is mounted at one end in the bearing block 14 which is securely mounted upon the ring 2. Upon this shaft are secured pinions 15 and 16 which when assembled in operative relation to the gear are on opposite sides of the block 14 and engage with the two rows of teeth 11 and 12 upon the gear.

Pitmen 20 and 21 are pivotally mounted upon the gear at diametrically opposite points. These pitmen are in turn connected with members 22 and 23, which as shown are pivoted upon the frame, but such an arrangement is not necessary, as the members 22 and 23 are simply representative of any members through which motion is transmitted to any device or mechanism it is desired to operate. The pitmen preferably connect with opposite sides of the gear to make a proper balance. While two pitmen have been shown, it will be understood that more may be used where desirable, care being taken that the same are mounted upon the gear in such relation to each other that a condition of balance will always be obtained.

The shaft 14 is driven in any desired manner, and for the purpose I have shown two engines 17 and 18 which are mounted within the frame. It is evident that other forms of motors may be used than that which is shown, and I do not limit myself in this respect. The shaft 13 may be connected with and disconnected from the engine by means of a suitable clutch mechanism which is represented by the outer fly-wheel member 25 and the inner conical member 19 in engagement therewith and freed by movement toward the engine.

From the construction above described a mechanism is obtained that is light, and yet strong and which is adapted to transmit motion with high efficiency.

Having thus described my invention, what I claim is:

1. The combination of a ring, a wheel journaled within and by means of said ring and overhanging it on both sides and having gear teeth on its overhanging portions, and two pinions engaging with said teeth for driving said wheel.

2. The combination of a ring, a revoluble member journaled within said ring and having gear teeth upon the outer periphery thereof, a pinion engaging with the teeth for driving said member, a pitman connected with said member, and driven means to which said pitman is connected.

3. The combination of a ring, a member journaled within said ring, said member having two rows of gear teeth upon its periphery, said gear teeth being upon opposite sides of the ring, and a double pinion engaging the teeth upon the member for driving the same.

4. The combination with a frame, of a ring carried thereby, a wheel journaled within the ring and having two sets of gear teeth on its periphery on opposite sides of the ring, a double pinion for driving said wheel, and pitmen connected with the said wheel.

5. The combination, with a separable ring, of a wheel within the said ring having teeth on its periphery, a set of balls between the wheel and ring, and means supported by the ring for driving the said wheel.

6. The combination with a ring, of a wheel within the ring, said wheel having two sets of gear teeth on its periphery on opposite sides of the ring, a set of balls between the wheel and ring, and a double pinion engaging the teeth upon the wheel for driving the same.

7. The combination of a frame, a stationary ring carried thereby, a member journaled in said ring and having two rows of gear teeth on opposite sides of the ring, a shaft journaled in a bearing rigid with the ring, and two pinions on the shaft on opposite sides of said journal for engaging the teeth upon said member.

8. The combination of a frame, a stationary ring carried thereby, a wheel journaled in the said ring, coöperating annular grooves in the adjacent faces of the ring and wheel, balls rolling in such grooves, said wheel having gear teeth upon the periphery thereof, a shaft journaled in a bearing rigid with the ring and two pinions rigid upon said shaft for driving the two sets of gear teeth.

9. The combination of a frame, a stationary ring carried thereby, a wheel journaled in said ring, coöperating annular grooves in the adjacent faces of the ring and wheel, balls rolling in said grooves, said wheel being provided with two rows of gear teeth on opposite sides of the ring, a shaft journaled adjacent to the ring, and two pinions on said shaft upon opposite sides of the ring engaging with the gear teeth upon the wheel to drive the same.

10. The combination of a frame, a stationary separable ring having lugs by which its parts are connected together and by which it is connected to the frame, an annular member journaled in said ring, there being two rows of gear teeth upon the annular member on opposite sides of the ring, a shaft journaled in a bearing rigid with the ring, and having means for driving the two sets of gear teeth, and a plurality of pitmen connected with the annular member.

11. The combination of a frame, a stationary ring carried thereby, an annular member journaled in said ring, there being gear teeth upon the periphery of the said annular member, a shaft journaled adjacent to the ring and having a pinion adapted to engage the gear teeth upon the annular member, and a pair of pitmen mounted upon the said annular member at points diametrically opposite to each other.

12. The combination of a frame, a stationary ring carried thereby, a revoluble member journaled in said ring and having gear teeth on the periphery thereof, a shaft journaled in a bearing rigid with the ring, a pinion thereon engaging the teeth upon the member to drive the same, a plurality of pitmen mounted upon the member, said pitmen being so disposed thereon as to maintain the member always in a state of balance, and mechanism with which the pitmen are connected.

13. The combination of a frame, a stationary ring carried thereby, a revoluble member journaled in said ring and having two rows of gear teeth on opposite sides of the ring, a shaft, two pinions thereon engaging the two sets of teeth upon the annular member, said shaft being journaled in the ring, and a bearing cap secured thereto.

14. The combination of a frame, a ring carried thereby, a revoluble member journaled in said ring and having two rows of gear teeth on opposite sides of the ring, a shaft, two pinions thereon engaging the two sets of gear teeth, said shaft being journaled in the ring between the pinions, a bearing cap secured to the ring, and a row of balls between the inner face of the ring and the corresponding portion of the member.

15. The combination of a frame, a ring carried thereby, a revoluble member journaled in said ring, there being coöperating annular grooves in the adjacent faces of the ring and member, balls in said grooves, said member having two rows of gear teeth on opposite sides of the ring, a shaft journaled in a bearing rigid with the said ring and having two pinions engaging with the two sets of gear teeth upon said member for driving the same, a pair of pitmen mounted upon the member on opposite sides and at points diametrically opposite, and members with which said pitmen are connected.

16. The combination of a ring made in sections and secured together to make a complete circle, a wheel within the ring, balls between the wheel and ring, two parallel sets of teeth on the wheel on opposite sides of the ring, and mechanism engaging said teeth.

17. The combination with a frame, a ring made of sections provided with lugs, means holding the lugs together to make a complete ring, means engaging the lugs and frame to secure them together, and a rotatable member within the ring having a ball bearing thereon.

18. The combination of a stationary ring, a wheel within the ring overhanging it on both sides, two sets of gear teeth on such overhanging portions respectively, a shaft journaled in a member rigidly carried by the ring, and two pinions on the shaft on opposite sides of said journal meshing with the two sets of gear teeth.

In testimony whereof, I hereunto affix my signature in the presence of two witnesses.

HARRY C. GAMMETER.

Witnesses:
ALBERT H. BATES,
BRENNAN B. WEST.